United States Patent
Aliakseyeu et al.

(10) Patent No.: US 11,924,709 B2
(45) Date of Patent: Mar. 5, 2024

(54) CONTROLLER, SYSTEM AND METHOD FOR PROVIDING A LOCATION-BASED SERVICE TO AN AREA

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Mustafa Tolga Eren, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 415 days.

(21) Appl. No.: 17/297,593

(22) PCT Filed: Jan. 3, 2020

(86) PCT No.: PCT/EP2020/050068
§ 371 (c)(1),
(2) Date: May 27, 2021

(87) PCT Pub. No.: WO2020/144108
PCT Pub. Date: Jul. 16, 2020

(65) Prior Publication Data
US 2022/0014879 A1    Jan. 13, 2022

(30) Foreign Application Priority Data
Jan. 7, 2019   (EP) ..................................... 19150529

(51) Int. Cl.
*H04W 4/029*   (2018.01)
*H04W 4/02*    (2018.01)
(Continued)

(52) U.S. Cl.
CPC .......... *H04W 4/029* (2018.02); *H04W 4/023* (2013.01); *H04W 4/38* (2018.02); *H04W 12/02* (2013.01); *H05B 47/115* (2020.01); *H05B 47/19* (2020.01)

(58) Field of Classification Search
CPC .......... G06Q 30/0251; G06Q 30/0261; G06Q 30/0269; G06Q 30/0271; H04L 67/306;
(Continued)

(56) References Cited

U.S. PATENT DOCUMENTS 9,710,402 B2    7/2017  Makke et al.
10,007,476 B1*  6/2018  Glikmann ............. H04L 67/125
(Continued)

FOREIGN PATENT DOCUMENTS

EP    2827252 A1    1/2015
JP    2008186371 A  8/2008
(Continued)

*Primary Examiner* — Matthew C Sams

(57) ABSTRACT

The invention to provides an improved controller for providing a location-based service to an area, wherein the controller comprises a memory and a transceiver, wherein the controller is configured to: obtain a location of a mobile device associated with a person; obtain sensor data from at least one sensor arranged for monitoring the person in the area when the obtained location of the mobile device is within the area; store the sensor data in the memory; forward, via the transceiver, the stored sensor data to the mobile device when the obtained location of the mobile device is no longer within the area, and subsequently delete the sensor data from the memory. The invention further provides related systems for providing a location-based service to an area and related methods.

15 Claims, 2 Drawing Sheets

(51) Int. Cl.
*H04W 4/38* (2018.01)
*H04W 12/02* (2009.01)
*H05B 47/115* (2020.01)
*H05B 47/19* (2020.01)

(58) Field of Classification Search
CPC ...... H04L 67/53; H04L 67/535; H04W 12/02; H04W 12/084; H04W 4/021; H04W 4/023; H04W 4/029; H04W 4/38; H05B 47/105; H05B 47/115; H05B 47/19; Y02B 20/40
See application file for complete search history.

(56) References Cited

U.S. PATENT DOCUMENTS

| | | | | |
|---|---|---|---|---|
| 2002/0174073 | A1* | 11/2002 | Nordman | G06Q 20/382 |
| | | | | 705/64 |
| 2009/0113532 | A1* | 4/2009 | Lapidous | H04L 9/32 |
| | | | | 709/219 |
| 2013/0132330 | A1 | 5/2013 | Hurwitz et al. | |
| 2013/0155947 | A1 | 6/2013 | Curlander | |
| 2015/0126223 | A1* | 5/2015 | Lee | H04W 4/021 |
| | | | | 455/456.3 |
| 2015/0154404 | A1 | 6/2015 | Patel et al. | |
| 2015/0242648 | A1 | 8/2015 | Lemmey et al. | |
| 2016/0381537 | A1* | 12/2016 | R | H04W 4/021 |
| | | | | 455/404.1 |
| 2017/0257575 | A1* | 9/2017 | Kim | H04N 23/633 |
| 2018/0053200 | A1 | 2/2018 | Cronin et al. | |
| 2018/0234181 | A1 | 8/2018 | Nyarko et al. | |
| 2019/0082291 | A1* | 3/2019 | Yoon | G01S 1/68 |

FOREIGN PATENT DOCUMENTS

| | | |
|---|---|---|
| JP | 2013171475 A | 9/2013 |
| JP | 2014126912 A | 7/2014 |
| JP | 2016058346 A | 4/2016 |
| JP | 2017191495 A | 10/2017 |
| WO | 2011001320 A1 | 1/2011 |
| WO | 2016122499 A1 | 8/2016 |

* cited by examiner

CONTROLLER, SYSTEM AND METHOD FOR PROVIDING A LOCATION-BASED SERVICE TO AN AREA

CROSS-REFERENCE TO PRIOR APPLICATIONS

This application is the U.S. National Phase application under 35 U.S.C. § 371 of International Application No. PCT/EP2020/050068, filed on Jan. 3, 2020, which claims the benefit of European Patent Application No. 19150529.6, filed on Jan. 7, 2019. These applications are hereby incorporated by reference herein.

FIELD OF THE INVENTION

The invention relates to a controller for providing a personalized service, such as a location-based service to an area. The invention further relates to a method of providing a personalized service, such as a location-based service to an area; and a corresponding computer program product. The invention further relates to a location-based service system for providing a location-based service to an area. The invention further relates to a lighting device comprising said controller and a light source; and to a lighting system.

BACKGROUND OF THE INVENTION

The increasing deployment of sensor networks to crowded areas has enabled the application of personalized services, such as Location-Based Services (LBS). For example: It is well known to track a person within a retail environment, e.g. by means of an Indoor Positioning System (IPS). It is moreover known to identify a person within a retail environment, and evaluate a behavior of said person within the retail environment, e.g. by means of a camera and image analysis, or e.g. by means of receiving sensor data from wearable and/or portable devices associated with said person. Such technologies may also enable creating a personal profile of said person for use in personalized services, e.g. by additionally retrieving information from social network databases based on the identity of said person. Such technologies may for example be used in checkout-less shopping; or used in personalized/targeted advertising based on location within the retail environment. See e.g. US2002/174073A1 and EP2827252A1 for such technologies.

Consequently, providing personalized services requires the use of personal sensitive data, such as a person's profile information, demographic information, behavioral data, real-time and historical activity data, data on geographic whereabouts, social interaction data, etc. Therefore, providing personalized services, such as LBS, may be disadvantageous in safeguarding the privacy of a person.

To cope with the privacy of a person, while still being able to provide personalized services, solutions are rendered wherein the data used for the personalized service is deleted. The disadvantage of such a solution is that the data created for enabling the personalized service is no longer available when said personalized service is provided to the same person again. This is especially disadvantageous for a retail environment, because a personal profile is often established in retail for a personalized service by over-time learning, and thus a system providing said personalized service has to create a personal profile from scratch and learn over-and-over again for providing said personalized service to a particular person. Hence, such systems, wherein data used for a personalized service is deleted (after providing the personalized service), are less effective and less efficient in providing a personalized service, such as e.g. Location-Based Service.

SUMMARY OF THE INVENTION

It is an object of the invention to provide an improved controller for providing a personalized service, such as a location-based service to an area, which at least alleviates the problems and disadvantages mentioned above. Thereto, the invention provides a controller for providing a location-based service to an area, wherein the controller comprises a memory and a transceiver, wherein the controller is configured to: obtain a location of a mobile device associated with a person; obtain sensor data from at least one sensor arranged for monitoring the person in the area when the obtained location of the mobile device is within the area; store the sensor data in the memory; forward, via the transceiver, the stored sensor data to the mobile device when the obtained location of the mobile device is no longer within the area, and subsequently delete the sensor data from the memory.

Hence, a controller is provided for providing a location-based service to an area. The controller comprises a memory and a transceiver. The controller is configured to obtain a location of a mobile device associated with a person. The controller is also configured to obtain sensor data from at least one sensor arranged for monitoring the person in the area when the obtained location of the mobile device is within the area. As a result, by knowing the location of the mobile device, hence the person associated therewith, and by knowing that the at least one sensor monitors the area, the controller is able to match the obtained sensor data from the at least one sensor uniquely with the mobile device.

The obtained sensor data is therefore associated with the mobile device and the person. This makes the sensor data privacy sensitive. The controller is configured to store the sensor data in the memory, from which the sensor data may be used for e.g. processing and/or providing the location-based service. Thus, the sensor data stored in the memory may be privacy sensitive.

Therefore, in order to provide a location-based service, while safeguarding privacy without deleting the sensor data, the controller is configured to forward, via the transceiver, the stored sensor data to the mobile device when the obtained location of the mobile device is no longer within the area. Thus, when the mobile device associated with the person (hence the person itself) leaves the area, the data is not immediately deleted but first forwarded to the mobile device. Subsequently to said forwarding, the controller is configured to delete the sensor data from the memory. Said forwarding may alternatively be phrased as sending, conveying, transmitting or transferring.

As a result, the controller according to the invention provides a clear advantage, because the privacy sensitive data is deleted from the memory of the controller when the mobile device (hence the person itself) leaves the area, such that privacy of the person (at that area) is safeguarded. Additionally, since the sensor data is forwarded to the mobile device (hence the person itself), the valuable sensor data (for providing a location-based service) may still be existing and available at a privacy secure device, as the mobile device is associated with the person itself. Not infringing privacy, while not losing the valuable sensor data, is a clear benefit.

In the present application, the mention of Location Based Services may mutatis mutandis be replaced by Personalized Services, as the advantages of the present invention applies to both kind of services. The controller may e.g. be embedded in a lighting device such as a luminaire, or may e.g. be part of a lighting device such as a luminaire. Thus, in an embodiment, the controller may be a lighting device.

In examples, the mobile device may for example be a smartphone, a smart wearable, smart goggles, a smartwatch, a fitness tracker, a smart garment, a tablet, or a scanning device for shopping. In examples, the transceiver may be a Radiofrequency transceiver for enabling wireless communication, such as Wi-Fi, Bluetooth, ZigBee, LoRa. Said transceiver may alternatively be arranged for wireless communication via Visible Light Communication and/or LiFi. The memory may be a local memory known in the art. Moreover, in examples, the controller may receive the location of the mobile device via the transceiver. The transceiver may be a wireless transceiver.

In examples, the location-based service may e.g. relate to personalized advertisement, checkout-less paying, monitoring a characteristic of a person, forwarding sensor data to a mobile device of a person, indoor positioning and/or indoor navigation, presence detection, crowd control, targeted messaging, gaming, augmented reality applications, security, social interaction, people survey, etc.

In examples, the area may be a retail area. For example, the area may be a fitting room. The area may also be an office floor. The area may also be a market or a market square. The area may alternatively be a festival area, a concert area, or a sports area, such as a stadium or hall. The area may moreover be a public area, such as e.g. a municipality hall or a park.

In an embodiment, the controller may be configured to: process the sensor data into a dataset suitable for use in the location-based service; and forward said dataset to the mobile device, via the transceiver, when the obtained location of the mobile device is no longer within the area, and subsequently delete the dataset from the memory. Such an embodiment may be advantageous, because the sensor data may be forwarded according to the invention in a processed format, which is the dataset suitable for use in the location-based service. In examples, the (memory) size of said dataset may be less than the size of the sensor data, as said processing may comprise compressing the sensor data in a smaller size. This may also be advantageous in forwarding the dataset to the mobile device.

In a further embodiment, the controller may be configured to use the sensor data and/or the dataset to provide the location-based service to the mobile device. Thus, the controller may not only store said sensor data and/or the dataset as mentioned before (without necessarily providing a location based service), but may also enable a location-based service in relation to the mobile device by using the sensor data and/or the dataset.

In a further embodiment, the dataset may be a personal profile associated with the person. Such a personal profile may for example comprise the demographics of the person, such as e.g. age and gender; or physical features of the person, such as e.g. size, weight, hair color, voice, eye color, iris, facial features, length, etc.; or social interactions of the person, such as e.g. indicator of friends, memberships, social media profiles; or behavioral characteristics of the person, such as e.g. time-spent at a location, interest in a product, routines, walking paths, etc.

In an embodiment, the controller may be configured to: receive an initial dataset associated with the person from the mobile device; and process both the sensor data and the initial dataset into the dataset. Such an embodiment may be additionally advantageous, because the controller may receive an initial dataset from the mobile device, which initial dataset may already provide valuable data for providing a location-based service, such that the controller may be more efficient in processing and providing the location-based service. This is done by the controller being configured to process both the sensor data and the initial dataset into the dataset according to the invention. For example, a person may enter and leave an area according to the invention during a first visit; such that the controller has forwarded the obtained sensor data to the mobile device of the person during the first visit when leaving the area. The forwarded sensor data may now become the initial dataset, which initial dataset is now securely stored on the mobile device associated with the person. Thus, when said person may enter and leave said area during a further visit; the initial dataset (i.e. the sensor data of the previous visit(s)) may now be processed together with the obtained sensor data of the respective further visit into the resulting dataset of the respective further visit. Therefore, as data is treated cumulatively, no loss occurs in the sensor data obtained over a plurality of visits. The controller is thereby much more efficient and effective in providing a location-based service, because the controller may be able to learn and utilize a larger dataset during processing. The controller is able to provide a more personalized and more accurate personalized service, such as a location-based service.

In examples, the controller may alternatively be configured to receive said initial dataset associated with the person from an external server; and process both the sensor data and the initial dataset into the dataset. For example, the controller may retrieve and/or obtain said initial dataset when said mobile device is detected within the area, or e.g. when the controller receives a signal from the mobile device to retrieve and/or obtain said initial dataset from such an external server.

In an embodiment, the controller may be configured to receive said location and/or said sensor data from the mobile device. For example, the mobile device may determine its location via a positioning system, such as e.g. an indoor positioning system, or GPS; which position is subsequently sent to the controller so as to obtain/receive said location. For example, the mobile device may be well suited to collect sensor data associated with the person, or with the behavior of the person, or with the characteristics of the person; which sensor data is subsequently sent to the controller so as to obtain/receive said location.

In an embodiment, the controller is configured to wait a period of time before forwarding the stored sensor data to the mobile device when the obtained location of the mobile device is no longer within the area, and subsequently deleting the sensor data from the memory. Such an embodiment is advantageous, because it may allow a person to briefly leave the area and return, without the consequence that all the obtained sensor data is lost. For example, a person going outside a restaurant area to fill a parking meter or to have a smoke, may return afterwards to the restaurant area. The controller will then not immediately delete the sensor data from the memory when the person is no longer within the area, but will wait for said period of time before doing so, because the possibility still remains that the person will reenter the restaurant area to continue its activity. Hence, such an embodiment is advantageous, because it prevents accidental deletion of sensor data. In an embodiment, said period of time may be at most 2 minutes. Such a time of 2 minutes may well match the brief instances persons take to leave an area while not intending to stop with their presence or their activity in that area. Alternatively, said period of time may be one of: at most 4 minutes, at most 5 minutes, at most 1 minute, at most 10 minutes.

Said period of time may also be set by the person associated with the mobile device. For example, said mobile device may comprise a user interface for receiving a user input indicative of said period of time. Said mobile device may communicate said user input, which user input comprises an indication of said period of time and/or said period of time, to the controller. The controller may receive this user input and determine said period of time. Thus, in an embodiment, the controller may be configured to receive a user input comprising an indication of said period of time and/or said period of time, and wait said period of time before forwarding the stored sensor data to the mobile device when the obtained location of the mobile device is no longer within the area. For example, the person may specify via such a user input that he/she would like to have a period of time of 2 minutes for a restaurant environment and 5 minutes for a retail environment and 10 minutes for a hospital environment. Hence, the person may indicate for different environments and/or areas what the value of said period of time should be.

Furthermore, in alternative examples, the controller according to the invention may be configured to obtain a preference from the mobile device to forward said dataset to the mobile device. Such a preference may be user input received by the mobile device and sent by the mobile device to the controller. The mobile device may e.g. receive such a user input via a user interface, which may be used by the person associated with the mobile phone to submit the preference regarding said forwarding.

Furthermore, in an embodiment, the controller according to the invention may be configured to convey, via the transceiver, a notification message to the mobile device when the sensor data is deleted from the memory. This is advantageous as the persons may be notified, e.g. with a push message, that the persons privacy sensitive data is deleted.

It is a further object of the invention to provide an improved location-based service system, which at least alleviates the problems and disadvantages mentioned above. Thereto, the invention further provides a location-based service system for providing a location-based service to an area, the location-based service system comprising: the controller according to the invention; a mobile device associated with a person; and at least one sensor arranged for monitoring the person within said area and providing sensor data. Thereby, advantages and/or embodiments applying to the controller according to the invention may mutatis mutandis apply to said system according to the invention.

Namely: in order to provide a location-based service, while safeguarding privacy without deleting the sensor data, such a location-based service system comprises a controller which is configured to forward, via the transceiver, the stored sensor data to the mobile device when the obtained location of the mobile device is no longer within the area. Thus, when the mobile device associated with the person (hence the person itself) leaves the area, the data is not immediately deleted but first forwarded to the mobile device. Subsequently to said forwarding, the controller is configured to delete the sensor data from the memory. Said forwarding may alternatively be phrased as sending, conveying, transmitting or transferring. As a result, location-based service system provides a clear advantage, because the privacy sensitive data is deleted from the memory of the controller when the mobile device (hence the person itself) leaves the area, such that privacy of the person (at that area) is safeguarded. Additionally, since the sensor data is forwarded to the mobile device (hence the person itself), the valuable sensor data (for providing a location-based service) may still be existing and available at a privacy secure device, as the mobile device is associated with the person itself. Not infringing privacy, while not losing the valuable sensor data, is a clear benefit.

In an embodiment, the at least one sensor may be at least one of: a camera, a microphone, a radiofrequency antenna, a thermopile sensor, a PIR sensor, a motion sensor, a light sensor. Such sensors may be particularly suited for monitoring the person in the area. For example, a camera may be used in combination with image analysis and/or machine learning to deduce properties associated with the person. Such properties may comprise the persons activity, mood, health, interests, etc. For example, a microphone may be used to monitor a voice, a command, a mood of a person; or a context in which a person is present. Similarly, a radiofrequency antenna may monitor the interaction of a person with other devices, and/or detect the connectivity of a person, and/or do RF-based sensing of the person to detect its posture, movement, activity, gestures, etc. Similarly, for example, a PIR sensor, a motion sensor, a light sensor may be used to monitor the person in the area, such as its presence, its walking patterns, etc. Moreover, said at least one sensor may also be at least one of: a thermopile array, a single pixel thermopile, a microwave sensor, RADAR, a Time-of-Flight sensor, an occupancy detector.

Moreover, said at least one sensor may, in examples, be a sensor external to the mobile device or the person. Said at least one sensor may for example an advanced sensor bundle present within a luminaire within the area.

As mentioned, the at least one sensor is arranged for monitoring the person in the area when the obtained location of the mobile device is within the area. Such an at least one sensor may, in examples, at least be integrated in the mobile device; because the mobile device associated with the person may be a suitable location to embed sensors for monitoring the person. Hence, in an embodiment, the mobile device comprises the at least one sensor; wherein the at least one sensor is one of a camera, a microphone, and/or a motion sensor; and wherein the mobile device is configured to send the respective sensor data of the at least one sensor to the controller. Thus, the mobile device may for example measure the movement and/or activity of the person with the motion sensor, measure the location of the person with the camera, measure the mood, behavior and/or health of the person with the camera, measure the mood, commands, activity of the person with the microphone, etc.

As mentioned, the controller is configured to obtain a location of the mobile device. In an embodiment, the mobile device may be arranged for determining its location via a positioning system, wherein the mobile device is configured to send said location to the controller, and the controller is configured to receive said location from the mobile device. In a further embodiment, the positioning system may be a Visible Light Communication indoor positioning system or a RF-based positioning system.

Alternatively, the location-based service system may comprise a positioning system for determining the location of the mobile device, wherein the positioning system is configured to send said location to the controller, and the controller is configured to receive said location from the mobile device. Hence, the positioning system now being part of the location-based service system.

In an embodiment, the location-based service system may further comprise a network of lighting devices, wherein the at least one sensor is embedded in at least one lighting device of the network of lighting devices. Hence, said network of lighting devices, such as e.g. luminaires on the ceiling, may advantageously be used to monitor the person within the area. Such a network of lighting devices may simultaneously serve as Visible Light Communication indoor positioning system.

It is a further object of the invention to provide an improved method, which at least alleviates the problems and disadvantages mentioned above. Thereto, the invention further provides a method of providing a location-based service to an area, wherein the method is being performed by a controller comprising a memory and a transceiver, the method comprising: obtaining a location of a mobile device associated with a person; obtaining sensor data from at least one sensor arranged for monitoring the person in the area when the obtained location of the mobile device is within the area; storing the sensor data in the memory; forwarding, via the transceiver, the stored sensor data to the mobile device when the obtained location of the mobile device is no longer within the area, and subsequently delete the sensor data from the memory. Thereby, advantages and/or embodiments applying to the controller and/or system according to the invention may mutatis mutandis apply to said method according to the invention.

In an embodiment, the method further comprising: processing the sensor data into a dataset suitable for use in the location-based service; and forwarding said dataset to the mobile device, via the transceiver, when the obtained location of the mobile device is no longer within the area, and subsequently delete the dataset from the memory.

In an embodiment, the method further comprising: using the sensor data and/or the dataset to provide the location-based service to the mobile device.

In an embodiment, the method further comprising: conveying and/or sending, via the transceiver, a notification message to the mobile device when the sensor data is deleted from the memory.

Alternatively, the methods according to the invention are performed by a system according to the invention comprising a controller according to the invention.

The invention further relates to a computer program product. Hence, the invention provides a computer program product for a computing device, the computer program product comprising computer program code to perform a method of the invention when the computer program product is run on a processing unit of the computing device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

It is a further object of the invention to provide an improved lighting device, which at least alleviates the problems and disadvantages mentioned above. Thereto, the invention further provides a lighting device comprising the controller according to the invention and a light source, wherein the lighting device is configured to illuminate, via the light source, said area and provide, via the controller, the location-based service to said area. Such a lighting device is advantageous, because illumination may for example be required to allow the person to be monitored in the area, which may be enabled by said lighting device comprising the light source. Moreover, advantages and/or embodiments applying to the controller according to the invention may mutatis mutandis apply to said lighting device according to the invention. The lighting device may also emit a Visible Light Communication signal for enabling indoor positioning based on VLC. Hence, the controller may receive the location of the mobile device associated with the person via either the mobile device or the indoor positioning system based on VLC.

In an alternative aspect of the invention, it is an object of the invention to provide an improved controller for providing a location-based service to an area, which at least alleviates the problems and disadvantages mentioned above. Thereto, the invention further provides a controller for providing a location-based service to an area, wherein the controller comprises a memory and a transceiver, wherein the controller is configured to: obtain a location of a mobile device associated with a person; obtain sensor data from at least one sensor arranged for monitoring the person in the area when the obtained location of the mobile device is within the area; store the sensor data in the memory; lock the sensor data with an authorization key for accessing to the sensor data; forward, via the transceiver, (i) the stored sensor data to a server and (ii) said authorization key to the mobile device when the obtained location of the mobile device is no longer within the area, and subsequently delete the sensor data from the memory. Said server may be a secure server, e.g. a third-party server. Said authorization key may alternatively be phrased as ownership or access key. Similarly, as discussed before, the controller according to the further aspect of the invention provides a clear advantage, because the privacy sensitive data is deleted from the memory of the controller when the mobile device (hence the person itself) leaves the area, such that privacy of the person (at that area) is safeguarded. Additionally, since the sensor data is forwarded to the server and is only accessible with the authorization key, and since the authorization key is forwarded to the mobile device (hence the person itself), the valuable sensor data (for providing a location-based service) may still be existing and available at a privacy secure server which is only accessible by the rightful owner (the person itself), as the mobile device is associated with the person itself. Not infringing privacy, while not losing the valuable sensor data, is a clear benefit.

In a further example thereof, the controller may be configured to receive the authorization key (back) from the mobile device and retrieve said sensor data from the server. For example, during a further visit of the person to the area after having left said area. The controller may further be configured to process both the retrieved sensor data and the sensor data into a dataset suitable for use in the location-based service. Such a dataset may be a personal profile. For example, during said further visit. Similarly, during said further visit, the controller may be configured to store said dataset in the memory; lock the dataset with a further authorization key for accessing to the dataset; forward, via the transceiver, (i) the stored dataset to the server and (ii) said further authorization key to the mobile device when the obtained location of the mobile device is no longer within the area, and subsequently delete the dataset from the memory.

The advantages and/or embodiments applying to the controller and/or system according to the first aspect of the invention may also apply mutatis mutandis to the controller and/or system according to the present further aspect of the invention.

In yet a further alternative aspect of the invention, it is an object of the invention to provide an improved controller for providing a location-based service to an area, which at least alleviates the problems and disadvantages mentioned above. Here, the data may be securely stored in a remote memory, hence safeguarding the privacy sensitive data, while still being able to use said data for location-based services when authorization is provided. Thereto, the invention further provides a controller for providing a location-based service to an area, wherein the controller comprises a transceiver, wherein the controller is configured to: obtain a location of a mobile device associated with a person; obtain sensor data from at least one sensor arranged for monitoring the person in the area when the obtained location of the mobile device is within the area; store the sensor data in a remote memory; lock the sensor data with an authorization key for accessing the sensor data; forward, via the transceiver, said authorization key to the mobile device when the obtained location of the mobile device is no longer within the area. As the sensor data is safely stored at the remote memory and only the person has the authorization key, the advantages mentioned according to the first aspect of the invention mutatis mutandis apply. Similarly, a system may be provided comprising said controller and said remote memory.

Moreover, in yet further examples, the controller may be configured to: process the sensor data into a dataset suitable for use in the location-based service. Similarly, the controller may be configured to store the dataset in the remote memory and lock the dataset with an authorization key for accessing the dataset. Such a dataset may be a personal profile. Further, the controller may be configured to receive the authorization key from the mobile device, and retrieve said dataset associated with the person from the remote memory; and process both the retrieved sensor data and the sensor data into the dataset. Thus, the controller may retrieve the dataset stored on the remote memory during a further visit of the person to the area (after the person had left the area). In this way, more data is present and more historical data is pre sent to provide the location-based service to the person, while safeguarding the privacy sensitive data during the time the person (e.g. detected by the mobile device associated therewith) is not located within the area.

The advantages and/or embodiments applying to the controller and/or system according to the first aspect of the invention may also apply mutatis mutandis to the controller and/or system according to the present yet further aspect of the invention.

BRIEF DESCRIPTION OF THE DRAWINGS

The invention will now be further elucidated by means of the schematic non-limiting drawings.

DETAILED DESCRIPTION OF THE EMBODIMENTS

As mentioned, providing personalized services requires the use of personal sensitive data. It may therefore be a challenge to safeguard privacy when providing personalized services. Deleting data used for personalized services may be solution, but may be disadvantageous, because cumulatively collected data may enable more effective and more efficient personalized services and by merely deleting said data a quality of the personalized services may be lost irreversibly. In such a situation, the collecting of data and learning therefrom has to start (over-and-over) again.

Therefore, the present invention provides an improved controller for providing a location-based service to an area, which at least alleviates the problems and disadvantages mentioned above. Similarly, an improved location-based service system, an improved lighting device, and an improved method is provided. Thereby, a location-based service system is an example of a personalized service system. Said location-based service system may analogously and/or alternatively apply to a personalized-service system for providing a personalized service to an area.

Figure 1:
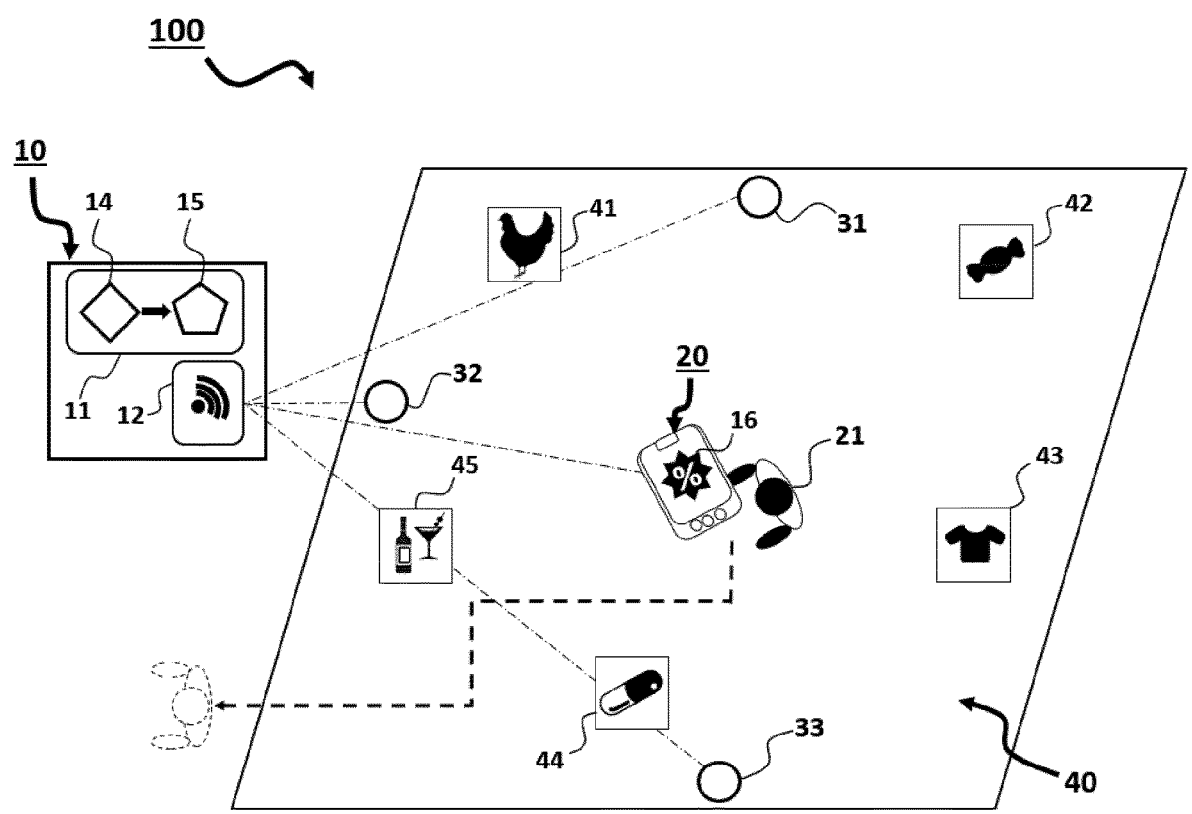
FIG. 1 depicts schematically an embodiment of a location-based service system according to the invention comprising the controller according to the invention, a mobile device associated with a person, at least one sensor arranged for monitoring the person.

FIG. 1 depicts schematically an embodiment of a location-based service system 100 according to the invention. The location-based service system 100 is arranged for providing a location-based service 16 to the area 40. Here, the area 40 is a shopping area comprising various subareas dedicated to a class of products. More specifically, the area 40 comprises a respective subarea dedicated to: meat 41, sweets 42, clothing 43, pharmaceuticals and/or drugs 44, and alcohol 45 (which are all schematically depicted). Such subareas may for example comprise stands, displays, aisles, etc. Such a shopping area may for example be present within a shopping mall or an airport.

The location-based service system 100 comprises a controller 10, a mobile device 20, and at least one sensor 31, 32, 33. The controller 10 comprises computing intelligence and sufficient processing power for performing analyses and personalized services, such as location-based services. The controller 10 comprises a transceiver 12 and a memory 11. The transceiver 12 is a Wi-Fi transceiver for enabling wireless communication, but may alternatively be a transceiver for Bluetooth, ZigBee, Lo-Ra, other Rf Modalities, or Light Communication and/or Li-Fi.

The mobile device 20 is a smartphone associated with a person 21. Alternatively, said smartphone may e.g. be a smart wearable device, such as a smartwatch or smart goggles or smart garments or a fitness tracker, or a tablet, a scanning device for retail. Thus, the person 21 may either be present within the shopping area 40 or (leave and be) outside the shopping area 40.

The location of the mobile device 20 may be determined. Referring to FIG. 1, albeit not depicted, the location-based service system 100 is in collaboration with, or further comprises a, positioning system. Said positioning system is an indoor positioning system (IPS) based on Visible Light Communication (VLC). The area 40 may therefore comprise light sources at pre-defined and known locations, which are emitting Visible Light Communication signals that comprise an identifier associated with each light source. Consequently, the mobile device 20 is able to determine its location by receiving said identifiers and perform localization such as e.g. triangulation. Such determination of location may also be performed centrally at the IPS based on VLC, and then communicated back to the mobile device 20 e.g. via a wireless internet connection and/or via a dedicated app. Such an IPS based on VLC is well known in the art and is not an essential element of the invention, because the location of the mobile device 20 may be determined by alternative means. Hence, alternatively, the location of the mobile device may be determined via GPS, Wi-Fi based positioning system, Bluetooth based positioning system, a local occupancy detector, data tag based location detection such as NFC or RFID, SLAM based positioning approaches, etc.

Still referring to FIG. 1, the at least one sensor 31, 32, 33 is arranged for monitoring the person 21 within said area 40 and providing (the resulting/respective) sensor data 14. Namely, the at least one sensor 31, 32, 33 comprises a camera 31, a Bluetooth receiver 32, and a microwave sensor 33 for monitoring the area 40. In examples, said at least one sensor may optionally be embedded in lighting devices such as luminaires.

The camera 31 is arranged to monitor the person 21 and provide data (image data). Here, the camera 31 at least detects the gaze of the person 21 and the interest of the person 21 in products of the respective subareas 41, 42, 43, 44, 45. The data provided by the camera may moreover serve as a basis for performing image analysis and/or machine learning. For example, by means of camera images, the person's activities, location, behavior, mood, and/or movement can be monitored, tracked and/or evaluated. Here, the Bluetooth receiver 32 at least detects an identity of the mobile device 20. The identity of the mobile device 20, which is associated with the person 21, may be used to retrieve social media data related to the person 21. Alternatively, the Bluetooth receiver 32 may also be arranged to detect a location of the mobile device 20 when the mobile device 20 is in connection with the Bluetooth receiver 32. Here, the microwave sensor 33 at least detects a gesture and/or posture of the person 21. The gesture and/or posture of the person 21 may provide additional information on the actions of the person 21; e.g. whether the person 21 is holding a product, placing back a product, putting a product into a basket, etc. All in all, the at least one sensor 31, 32, 33 is monitoring the person 21 accurately within said area 40 and providing respective sensor data 14. Alternatively, the at least one sensor may be at least one of any other suitable sensing means for monitoring a person within an area, as partly mentioned before.

Still referring to FIG. 1, the controller 10 is configured to obtain the location of the mobile 20 device within the area 40. As mentioned, here, the location of the mobile device 20 is determined via an Indoor Positioning System (not depicted) based on VLC. The mobile device 20 sends its location thereby to the controller 10, and the controller 10 receives said location from the mobile device 20 via its transceiver 12. Alternatively, whenever the location of the mobile device is determined centrally by the IPS based on VLC, the IPS itself may forward the location to the controller according to the invention. The controller 10 is also able to obtain the location of the mobile device 20 when the mobile device 20 is outside the area 40, so as to determine that the mobile device 20 is no longer within the area 40. The controller 10 is also configured to obtain the sensor data 14 from the at least one sensor 31, 32, 33 arranged for monitoring the person 21 in the area 40 when the obtained location of the mobile device 20 is within the area 40. As a result, by knowing the location of the mobile device 20, hence the person 21 associated therewith, and by knowing that the at least one sensor 31, 32, 33 monitors the area 40, the controller 10 is able to match the obtained sensor data 14 from the at least one sensor uniquely with the mobile device 20 (e.g. as known in the art).

The obtained sensor data 14 is therefore associated with the mobile device 20 and the person 21. This makes the sensor data 14 privacy sensitive. The controller 10 is configured to store the sensor data 14 in the memory 11, from which the sensor data 14 may be used for processing and/or providing the location-based service 16. Here, the location-based service 16 is personalized advertisement 16 based on an interest of the person 21 in the products of the respective subareas dedicated to: meat 41, sweets 42, clothing 43, pharmaceuticals and/or drugs 44, and alcohol 45 as derived from the obtained sensor data 14. Moreover, as the person 21 may recurrently visit the shopping area 40, the cumulative collection of data may render each time a more effective personalized advertisement.

Namely: The at least one sensor 31, 32, 33 provides sensor data 14, and the controller 10 receives said sensor data. The sensor data 14 comprises, as partly mentioned before, valuable information on at least the identity, gaze, and gestures of the person 21; based on which the interest of the person 21 in a product of said subareas may be determined.

Still referring to FIG. 1, the controller 10 processes the sensor data 14 into a dataset 15. This dataset 15 is the personal profile 15 of the person 21. Said personal profile 15 comprises the information on the interests of the person 21 in a product of said subareas 41, 42, 43, 44, 45; and the identity (as e.g. detected by the Bluetooth receiver 32) and retrieved addresses of the person 21 (which may be retrieved by the controller 10 based on the identity). For example, here, the gaze of a person 21 may be more often directed to the pharmaceuticals and/or drugs subarea 44. The camera may observe that the person 21 spends more time at the pharmaceuticals and/or drugs subarea 44. Hence, the person's interest in pharmaceuticals and/or drugs may be concluded. The person may subsequently show an interest in the alcohol subarea 45. For example, by the person's movement towards or in that subarea. The microwave sensor 33 may provide data in which it is detected that the person 21 picks ups wine bottles and looks at them. Such a detection may be complemented by the camera 31 detecting the person 21 being active at the alcohol subarea 45 looking at wines. Hence, the person's interest in alcohol may be concluded.

As a result, the location-based service 16 may provide a personalized advertisement 16 providing a discount on beverages to the person 21. The location-based service 16 may further provide a personalized advertisement 16 providing information on health insurances and/or healthy living lifestyles to the person 21. Said personalized advertisement 16 is conveyed or sent by the controller 10 to the mobile device 20 by known means. As the sensor data 14 and the personal profile 15 do not indicate an interest of the person 21 in sweets, meat and/or clothing, the controller may refrain from or lower the rate of sending personalized advertisements within such areas.

Thus, the controller 10 is using the sensor data 14 and/or the personal profile 15 to provide the location-based service to the mobile device 20 associated with the person 21. The sensor data 14 and/or the personal profile 15 are privacy sensitive; because the sensor data 14 and/or the personal profile 15 may indicate that the person 21 is ill and/or fond of alcohol, while he does not want to scatter this information around in systems and servers in general. Merely deleting the sensor data 14 and the personal profile 15 would limit the effectiveness and or efficiency of providing location-based services; as more data allows more analysis and/or a recurrent visit of the person to the area requires less learning effort when data of a previous visit is already present.

Therefore, in order to provide the location-based service 16, while safeguarding privacy without deleting the sensor data 14 and the personal profile 15, the controller 10 sends, via the transceiver 12, the stored sensor data 14 and the personal profile 15 to the mobile device 20 when the obtained location of the mobile device 20 is no longer within the area 40 (not depicted). Thus, when the mobile device 20 associated with the person 21 (hence the person 21 itself) leaves the area 40, the sensor data 14 and/or the personal profile 15 is not immediately deleted but first sent (i.e. forwarded) to the mobile device 20. Subsequently to said sending/forwarding, the controller 10 is configured to delete the sensor data 14 and the personal profile 15 from the memory 11.

As a result, the controller 10 according to the invention provides a clear advantage, because the privacy sensitive data 14, 15 is deleted from the memory 11 of the controller 10 when the mobile device 20 leaves the area 40, such that privacy of the person 21 associated with the mobile device 20 is safeguarded. Additionally, since the sensor data 14 and/or the personal profile 15 is forwarded to the mobile device 20, the valuable data for providing a location-based service may still be existing and available at a privacy secure device, as the mobile device 20 is associated with the person 21 itself. Not infringing privacy, while not losing the valuable sensor data 14 and personal profile 15, is a clear benefit.

In an embodiment (not depicted), partly similar to the embodiment depicted in FIG. 1, the controller receives an initial dataset from the mobile device, which initial dataset is associated with the person and its previous visits to the shopping area. Namely, this initial dataset is an initial personal profile, which is cumulatively established each time the person visits the shopping area. The controller processes both the sensor data obtained from the person's present visit and the initial personal profile into a (present) personal profile of the current visit. Similarly, the controller forwards, via the transceiver, the stored sensor data and/or the established personal profile (both of the current visit) to the mobile device when the obtained location of the mobile device is no longer within the area, and subsequently deletes the sensor data and the personal profile from the memory.

Optionally, the controller 10 may send, via the transceiver 12, a message to the mobile device 20 when the sensor data 14 is deleted from the memory 11. Such a message may e.g. be push message. Alternatively, the controller may send such a message by instructing another device, such as a remote server and/or cloud; hence conveying said message instead of directly sending by itself.

Thereby, since historical and/or cumulative data is taken into account, the location-based service of providing personalized advertisement is more effective and efficient. For example, when the person never is detected to have interest in the subarea of clothing during its previous visits and now currently has, the personalized advertisement may provide general look books and/or advertisement for a customer card. For example, when the person is detected to have been mainly interested in dresses in the subarea of clothing during its previous visits, the personalized advertisement may be related to the newest collection of dresses at the time of the current visit. Hence, a clear advantage is present when providing the controller with an initial personal profile (or alternatively mutatis mutandis initial sensor data).

Figure 2:
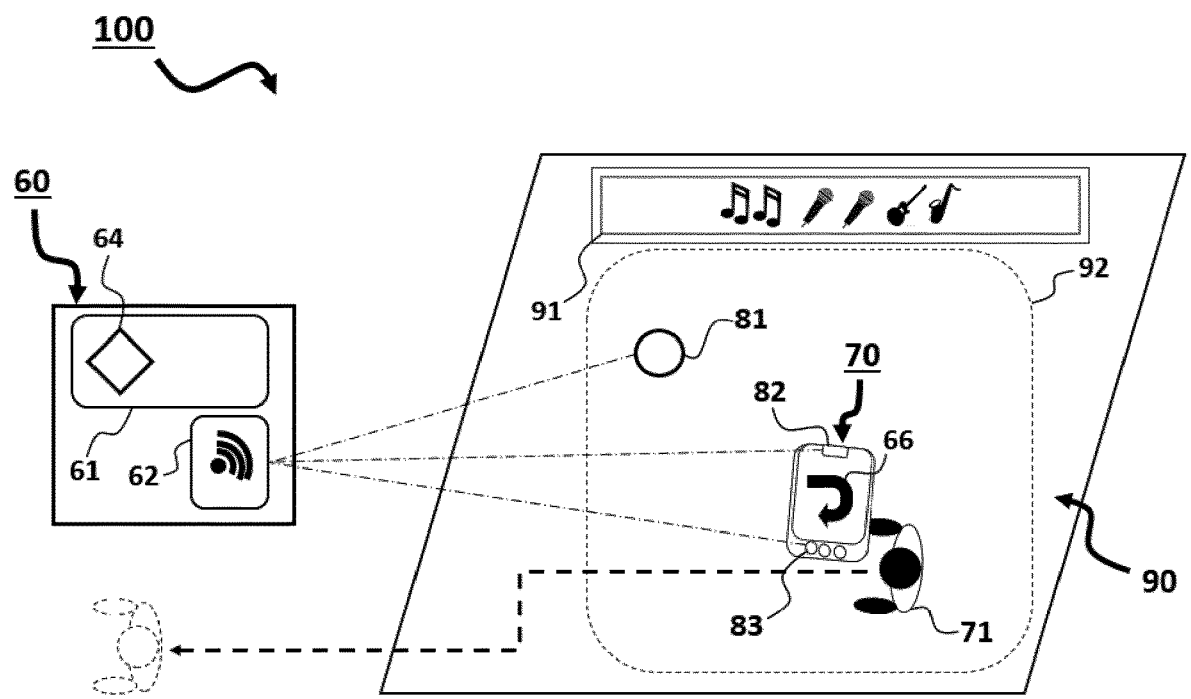
FIG. 2 depicts schematically another embodiment of a location-based service system according to the invention comprising the controller according to the invention, a mobile device associated with a person, at least one sensor arranged for monitoring the person.

FIG. 2 depicts schematically an embodiment of a location-based service system 200 according to the invention, which is partly similar to the embodiment depicted in FIG. 1, but wherein the location-based service 66 and the at least one sensor 81, 82, 83 are at least different.

The location-based service system 200 is arranged for providing a location-based service 66 to the area 90. Here, the area 90 is a festival venue with a main stage 91 and a dancing area 92. The location-based service system 200 comprises a controller 60 according to the invention, a mobile device 70, and at least one sensor 81, 82, 83. The controller 60 comprises a 5G-transceiver 62 and a memory 61. The transceiver 12 may alternatively be a transceiver for Wi-Fi, Bluetooth, ZigBee, Lo-Ra, or Light Communication and/or Li-Fi. The mobile device 70 is a smartphone associated with a person 71. The person is visiting the area 90 of the festival venue and may be active in the dancing area 92. Alternatively, said smartphone may e.g. be a smart wearable device, such as a smartwatch or smart goggles or smart garments or a fitness tracker, or a tablet.

The location of the mobile device 70 may be determined by the mobile device 70 itself by means of GPS (not depicted). The mobile device 70 is sends said location to the controller 60, and the controller 60 is configured to receive said location from the mobile device 70. The controller 60 is also able to obtain the (GPS) location of the mobile device 70 when the mobile device 70 is outside the area 90, so as to determine that the mobile device 70 is no longer within the area 90. Alternatively, the location of the mobile device may be determined via e.g. a Wi-Fi based positioning system, Bluetooth based positioning system, a local occupancy detector, data tag based location detection such as NFC or RFID; and subsequently send to the controller via such a positioning system and/or detecting means.

Still referring to FIG. 2, the at least one sensor 81, 82, 83 is arranged for monitoring the person 71 within said area 90 and providing (the resulting/respective) sensor data 64. Namely, the at least one sensor 81, 82, 83 comprises a (360-view) panoramic camera 81, a motion detector 82 embedded in the mobile device 70, and a microphone 83 embedded in the mobile device 70; all monitoring the area 90. The mobile device 70 sends the respective sensor data of the motion detector 82 and the microphone 83 to the controller 60.

The camera 81 is arranged to monitor the person 71 and provide data (image data). Here, the camera 81 at least detects the activity of the person 71. For example, the camera 81 may determine whether the person 71 is dancing in the dancing area 92, or is standing still. Similarly, the motion detector 82 embedded in the mobile device 70 determines whether the person is at rest or dancing. Moreover, the microphone 83 determines the social context and/or speech of the person 71 and/or speech associated with the person 71. For example, here, the microphone 83 renders conversation data associated with the person 71, e.g. a conversation between the person 71 with a friend. Said conversation data may indicate that the person 71 is hungry, or wants to buy merchandise associated with the act on the main stage 91. Alternatively, the microphone may be configured to receive/detect a voice command. All respective data is sent to the controller 60 as sensor data.

The controller 60 is configured to obtain the sensor data 64 from the at least one sensor 81, 82, 83 arranged for monitoring the person 71 in the area 90 when the obtained location of the mobile device 70 is within the area 90. As a result, by knowing the location of the mobile device 70, hence the person 71 associated therewith, and by knowing that the at least one sensor 81, 82, 83 monitors the area 90, the controller 60 is able to match the obtained sensor data 64 from the at least one sensor uniquely with the mobile device 70.

The obtained sensor data 64 is therefore associated with the mobile device 70 and the person 71. This makes the sensor data 64 privacy sensitive. The controller 60 is configured to store the sensor data 64 in the memory 61, from which the sensor data 64 may be used for providing the location-based service 66. Alternatively, in embodiments, the sensor data may merely be stored in the memory without providing a particular location-based service. Here, the location-based service 66 is a personalized navigation recommendation based on the social context of the person 71 at the festival venue as derived from the obtained sensor data 64. For example, the controller 60 may determine that the person 71 is not dancing (via the camera 81 and the motion detector) and may determine that the person is hungry (via a conversation detected with the microphone and e.g. analyzed by the controller). When the controller 60 determines that the person is not dancing and hungry, the controller 60 may convey a message to the mobile device 70 to indicate the way to navigate to the nearest food stand. Alternatively, the personalized navigation recommendation may be used to detect the person is searching for his friends (via the orientation sensor and the camera both detecting the person looking around seeking, and e.g. via the microphone indicating friends voices are not present and/or the persons voice indicating a command that the person is looking for his friends). The controller may subsequently indicate a path to navigate to find the person's friends and/or find a (e.g. pre-agreed) meeting point location.

Thus, the controller 60 is using the sensor data 64 to provide the location-based service 66 to the mobile device 70 associated with the person 71. The sensor data 64 is privacy sensitive; because the sensor data 64 is a representation of the person's activities, interests, and social interactions, etc. Merely deleting the sensor data 64 would limit the effectiveness and or efficiency of providing said location-based service 66; as more data allows less learning effort when data of a previous visit is already present.

Therefore, in order to provide the location-based service 66, while safeguarding privacy without deleting the sensor data 64, the controller 60 forwards, via the transceiver 62, the stored sensor data 64 to the mobile device 70 when the obtained location of the mobile device 70 is no longer within the area 90 (not depicted). Thus, when the mobile device 70 associated with the person 71 (hence the person 71 itself) leaves the area 90, the sensor data 64 is not immediately deleted but first forwarded to the mobile device 70. Subsequently to said forwarding, the controller 60 is configured to delete the sensor data 64 from the memory 61.

As a result, the controller 60 according to the invention provides a clear advantage, because the privacy sensitive data 64 is deleted from the memory 61 of the controller 60 when the mobile device 70 leaves the area 90, such that privacy of the person 70 associated with the mobile device 70 is safeguarded. Additionally, since the sensor data 64 is forwarded to the mobile device 70, the valuable data for providing a location-based service may still be existing and available at a privacy secure device, as the mobile device 70 is associated with the person 71 itself. Not infringing privacy, while not losing the valuable sensor data 64 and personal profile 65, is a clear benefit.

In an embodiment (not depicted), partly similar to the embodiment depicted in FIG. 1 and/or FIG. 2, but now the controller waits a period of time before sending/forwarding the stored sensor data to the mobile device when the obtained location of the mobile device is no longer within the area, and subsequently deleting the sensor data from the memory. For example, the person of the embodiment depicted in FIG. 1 may leave the retail area shortly for going to the loo. In such a situation, the sensor data is not immediately forwarded, as there may be a possibility the person returns to the area and continues his activities from where the person left of Hence, said period of time may be five minutes in such a context. For example, the person of the embodiment depicted in FIG. 2 may leave the perimeters of the festival venue for no reason, said period of time may therefore be two minutes. Whenever the person returns, the system operates as is, but if the person remains outside of the area, the controller forwards the stored sensor data according to the invention. Alternatively, the person may provide a user input to the controller, the user input comprising an indication of said period of time and/or said period of time.

In embodiments (not depicted), partly similar to the embodiments depicted in FIG. 1 and FIG. 2, the system may comprise a lighting device comprising the controller according to the invention. The lighting device comprises a light source, which conveys the location-based service provided by the controller to the mobile device via Visible Light Communication.

Figure 3:
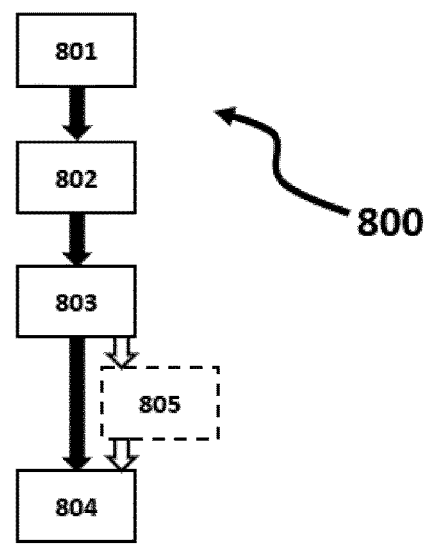
FIG. 3 depicts schematically an embodiment of a method according to the invention.

FIG. 3 depicts schematically, by non-limiting example, a method 800 a method of providing a location-based service to an area. The method is performed by a controller according to the invention. Alternatively, the method is performed by a system according to the invention comprising such a controller according to the invention. The controller comprises a memory and a transceiver. The method comprises a first step (801) of obtaining a location of a mobile device associated with a person; and a second step (802) of obtaining sensor data from at least one sensor arranged for monitoring the person in the area when the obtained location of the mobile device is within the area. The method further comprises a step (803) of storing the sensor data in the memory. The method further comprises a step (804) of forwarding, via the transceiver, the stored sensor data to the mobile device when the obtained location of the mobile device is no longer within the area, and subsequently delete the sensor data from the memory.

Optionally, also depicted in FIG. 3, the method further comprises a step (805) of processing the sensor data into a dataset suitable for use in the location-based service; and forwarding said dataset to the mobile device, via the transceiver, when the obtained location of the mobile device is no longer within the area, and subsequently delete the dataset from the memory. Said dataset may be a personal profile of the person as established by the controller. Optionally, not depicted, the method further comprises the step of using the sensor data and/or the dataset to provide the location-based service to the mobile device.

In an embodiment (not depicted), partly similar to the embodiment depicted in FIG. 1 and/or FIG. 2, the location-based service system comprises a controller, a mobile device associated with a person, a remote memory, and at least one sensor. The controller provides a location-based service to an area. The controller comprises a transceiver. The transceiver is a wireless transceiver. During a first visit of the person to the area, the controller obtains the location of the mobile device associated with the person. The controller further obtains sensor data from the at least one sensor arranged for monitoring the person in the area when the obtained location of the mobile device is within the area. The at least one sensor and the location-based service may be similar as discussed before in the depicted embodiments, for example. The controller stores the sensor data in a remote memory. In some alternative examples, said remote memory may be a device associated with the person, such as the mobile device. Moreover, the controller locks the sensor data with an authorization key for accessing the sensor data. The sensor data cannot be retrieved or accessed without said authorization key. The controller furthermore forwards, via the transceiver, the authorization key to the mobile device associated with the person when the obtained location of the mobile device is no longer within the area. For example, when the person leaves the area and is no longer of interest to be provided the location-based service. However, during a second visit of the person the area, the mobile device may send the authorization key to the controller. Alternatively, the controller may poll or request said authorization key from the mobile device (when detecting the presence of the mobile device within the area). The controller thus obtains and/or retrieves the authorization key. The controller then retrieves the sensor data of the first visit of the person to the area. The controller then obtains the sensor data (of the second visit) and processes the retrieved sensor data (of the first visit) and the sensor data (of the second visit) into a dataset (or phrased alternatively into sensor data of further visit). The dataset is again, similarly, stored in the remote memory and locked with a further authorization key. This process may continue for each visit of the person to the area.

The invention claimed is:

1. A controller for providing a location-based service to an area and to a mobile device associated with a person within said area, wherein the controller comprises a memory and a transceiver, wherein the controller is configured to:
   obtain a location of the mobile device associated with the person;
   obtain sensor data from at least one sensor arranged for monitoring the person in the area when the obtained location of the mobile device is within the area;
   wherein the at least one sensor is at least one of: a camera, a microphone, a radiofrequency antenna, a thermopile sensor, a PIR sensor, a motion sensor, a light sensor;
   store the sensor data in the memory;
   forward, via the transceiver, the stored sensor data to the mobile device when the obtained location of the mobile device is no longer within the area, and subsequently delete the sensor data from the memory.

2. The controller according to claim 1, wherein the controller is configured to:
   process the sensor data into a dataset suitable for use in the location-based service; and
   forward said dataset to the mobile device, via the transceiver, when the obtained location of the mobile device is no longer within the area, and subsequently delete the dataset from the memory.

3. The controller according to claim 1, wherein the controller is comprised by a lighting device.

4. The controller according to claim 2, wherein the dataset is a personal profile associated with the person.

5. The controller according to claim 1, wherein the controller is configured to receive said location and/or said sensor data from the mobile device.

6. The controller according to claim 1, wherein the controller is configured to wait a period of time before forwarding the stored sensor data to the mobile device when the obtained location of the mobile device is no longer within the area, and subsequently deleting the sensor data from the memory; wherein said period of time is at most 2 minutes.

7. The controller according to claim 1, wherein the controller is configured to obtain a preference from the mobile device to forward said dataset to the mobile device, and to forward said dataset based on said preference.

8. The controller according to claim 1, wherein the controller is configured to receive a user input comprising an indication of a period of time and/or a period of time, and to wait said period of time before forwarding the stored sensor data to the mobile device when the obtained location of the mobile device is no longer within the area.

9. A location-based service system for providing a location-based service to an area and to a mobile device associated with a person within said area, the location-based service system comprising:
   the controller according to claim 1,
   the mobile device associated with the person; and
   at least one sensor arranged for monitoring the person within said area and providing sensor data.

10. The location-based service system according to claim 9, wherein the mobile device comprises the at least one sensor; wherein the at least one sensor is one of a camera, a microphone, and/or a motion sensor; and wherein the mobile device is configured to send the respective sensor data of the at least one sensor to the controller.

11. The location-based service system according to claim 9, wherein the system comprises a positioning system for determining the location of the mobile device, wherein the positioning system is configured to send said location to the controller, and the controller is configured to receive said location from the positioning system.

12. A method of providing a location-based service to an area and to a mobile device associated with a person within said area, wherein the method is being performed by a controller comprising a memory and a transceiver, the method comprising:
   obtaining a location of the mobile device associated with the person;
   obtaining sensor data from at least one sensor arranged for monitoring the person in the area upon determining the obtained location of the mobile device is within the area, wherein the at least one sensor is at least one of: a microphone, a radiofrequency antenna, a thermopile sensor, a PIR sensor, a motion sensor, a light sensor,
   storing the sensor data in the memory;
   forwarding, via the transceiver, the stored sensor data to the mobile device upon determining the obtained location of the mobile device is no longer within the area, and subsequently delete the sensor data from the memory.

13. The method according to claim 12, the method further comprising:
   processing the sensor data into a dataset suitable for use in the location-based service; and
   forwarding said dataset to the mobile device, via the transceiver, upon determining the obtained location of the mobile device is no longer within the area, and subsequently delete the dataset from the memory.

14. The method according to claim 12, the method further comprising:
   using the sensor data and/or the dataset to provide the location-based service to the mobile device.

15. A non-transitory computer readable medium comprising instructions when executed by one or more processors cause the one or more processors to perform the method of claim 12.

* * * * *